No. 829,926. PATENTED AUG. 28, 1906.
W. C. LIPE.
GEAR.
APPLICATION FILED OCT. 30, 1905.
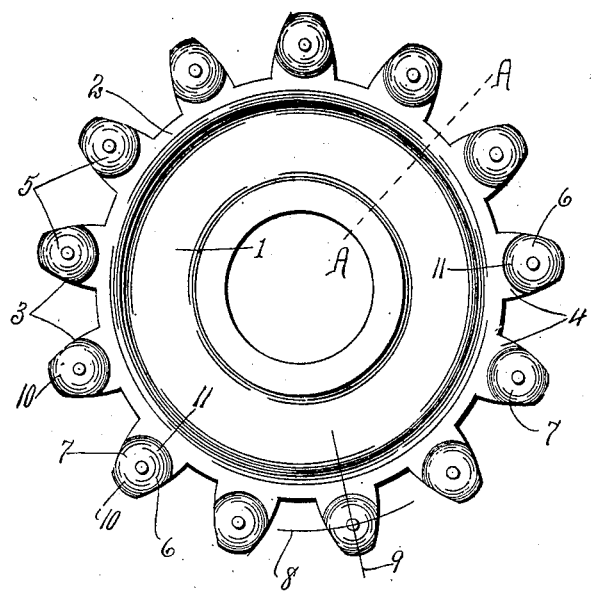
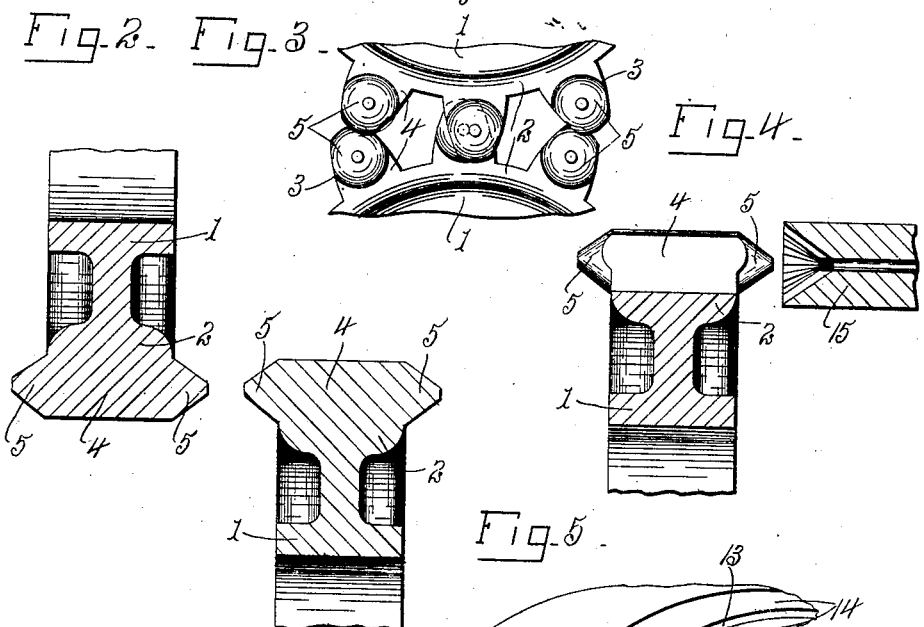
WITNESSES:
Chas. J. Toner.
Chas. H. Young.
INVENTOR
Willard C. Lipe
BY
Hoyt Parsons
ATTORNEYS

UNITED STATES PATENT OFFICE.

WILLARD C. LIPE, OF SYRACUSE, NEW YORK.

GEAR.

No. 829,926.   Specification of Letters Patent.   Patented Aug. 28, 1906.

Application filed October 30, 1905. Serial No. 284,981.

*To all whom it may concern:*

Be it known that I, WILLARD C. LIPE, of Syracuse, in the county of Onondaga and State of New York, have invented a certain new and useful Gear, of which the following is a specification.

My invention has for its object the production of a gear which can be readily moved laterally into engagement with another gear; and to this end it consists in the novel combinations and features hereinafter set forth, and pointed out in the claims.

In describing this invention reference is had to the accompanying drawings, in which like characters designate corresponding parts in all the views.

Figure 1 is a face view of a gear embodying my invention. Fig. 2 is a sectional view of portions of two gears of the same construction as the one shown in Fig. 1. Fig. 3 is a face view of portions of the gears illustrated in Fig. 2. Fig. 4 is a sectional view on line A A, Fig. 1, a part of a hollow cutter for shaping the ends of the gear-teeth being also shown. Fig. 5 is an isometric view of a portion of a blank from which the gear may be formed.

To those skilled in the art it is well known that in speed-changing gearing for automobiles and other mechanical apparatus and devices considerable difficulty is experienced in moving one gear laterally into engagement with another, especially when one or both of the gears are in motion.

In carrying out my invention I provide gears with teeth having their ends of special construction for facilitating movement of the gears laterally into engagement with each other.

The bodies 1, the rims 2, and the engaging faces 3 of the gear-teeth 4 may all be of any desirable form, size, and construction. The opposite ends 5 of the teeth 4 project beyond contiguous portions of the rim 2 and are fixed relatively to the rim. These ends are substantially conical and are arranged with their longitudinal axes intersecting the pitch-line, being thus provided with opposite convex surfaces 6 7, inclining from the faces of the teeth toward the points of intersection of the pitch-line 8 and lines 9, passing radially through the ends of the teeth, and with additional convex surfaces 10 11, inclining from substantially the apices and the roots of the teeth toward said points of intersection, contiguous edges of these surfaces 6, 7, 10, and 11 merging into intervening convex surfaces. By forming the projecting ends of the teeth as described I cut away the metal which ordinarily projects beyond the pitch-line at the ends of the teeth and impedes the movement of gears laterally into engagement with each other. It is thus apparent, as shown in Fig. 3, that a gear embodying my invention may commence to move laterally into engagement with a like gear when the contiguous teeth of said gears are nearly opposite each other and that the inclined surfaces of the ends of the teeth slide along each other and facilitate the operative engagement of the working faces of the teeth of the gears.

The illustrated exemplification of my gear may be readily formed as follows. A blank of the construction shown in Fig. 5 is provided, the same having on opposite sides of its rim flat surfaces 13 and surfaces 14, diverging from the inner and outer edges of the surfaces 13. Teeth are formed in this blank in the usual way by a milling-cutter or other means. A hollow cutter 15, Fig. 4, then operates upon the ends of the teeth and shapes the same to substantially conical form. It will be understood, however, that this is only one of the many possible ways of forming the projecting ends of the teeth of gears embodying my invention.

To those skilled in the art it will be apparent that the ends of the teeth of gears embodying my invention possess a minimum amount of surface which can impede the lateral engagement of one gear with another, that the inclined surfaces of the projecting ends of the teeth facilitate the ready lateral engagement of one gear with another, and that the large amount of space interposed between the inclined surfaces of contiguous teeth of the respective gears at the pitch-line affords a maximum amount of time for the lateral engagement of the gears.

The construction of my gear will now be readily understood upon reference to the foregoing description and the accompanying drawings.

Having thus fully described my invention, what I claim as new, and desire to secure by Letters Patent, is—

1. A gear having teeth formed with convex surfaces fixed relatively to the rim of the gear and inclining from faces of the teeth toward the points of intersection of the pitch-line and lines passing radially through the ends of the teeth, substantially as and for the purpose specified.

2. A gear having teeth formed with end extensions fixed relatively to the rim of the gear and having their longitudinal axes intersecting the pitch-line, said extensions being formed with convex surfaces inclining from substantially the apices of the teeth toward the pitch-line, substantially as and for the purpose described.

3. A gear having teeth formed with convex end surfaces fixed relatively to the rim of the gear and inclining from substantially the roots of the teeth toward the pitch-line, substantially as and for the purpose set forth.

4. A gear having teeth formed with convex end surfaces fixed relatively to the rim of the gear and inclining from substantially the apices and the roots of the teeth toward the points of intersection of the pitch-line and lines passing radially through the ends of the teeth, substantially as and for the purpose specified.

5. A gear having teeth formed with substantially conical ends fixed relatively to the rim of the gear, said ends facilitating the lateral movement of the gear into engagement with another gear, substantially as and for the purpose described.

6. A gear having teeth formed at their ends with convex surfaces fixed relatively to the rim of the gear and converging toward the points of intersection of the pitch-line and lines passing radially through the ends of the teeth, substantially as and for the purpose set forth.

7. A gear having teeth formed with ends fixed relatively to the rim of the gear and projecting laterally beyond contiguous portions of the rim, and having convex surfaces inclining from faces of the teeth toward the points of intersection of the pitch-lines and lines passing radially through the ends of the teeth, substantially as and for the purpose specified.

8. A gear having teeth formed with substantially conical ends fixed relatively to the rim of the gear and projecting laterally beyond contiguous portions of the rim, said ends facilitating the lateral movement of the gear into engagement with another gear, substantially as and for the purpose described.

9. A gear having teeth formed with opposite substantially conical ends fixed relatively to the rim of the gear and projecting laterally beyond contiguous portions of the rim, said ends facilitating the lateral movement of the gear into engagement with another gear, substantially as and for the purpose set forth.

10. A gear having teeth formed with ends fixed relatively to the rim of the gear and projecting laterally beyond contiguous portions of the rim, said ends having opposite convex surfaces inclined with respect to contiguous faces of the main portions of the teeth, and said ends facilitating the lateral movement of the gear into engagement with another gear, substantially as and for the purpose specified.

In testimony whereof I have hereunto signed my name, in the presence of two attesting witnesses, at Syracuse, in the county of Onondaga, in the State of New York, this 28th day of October, 1905.

WILLARD C. LIPE.

Witnesses:
 S. DAVIS,
 R. ARONSON.